No. 641,881. Patented Jan. 23, 1900.
J. H. O'BRIEN.
HUB FOR VEHICLE WHEELS.
(Application filed Apr. 1, 1899.)
(No Model.)
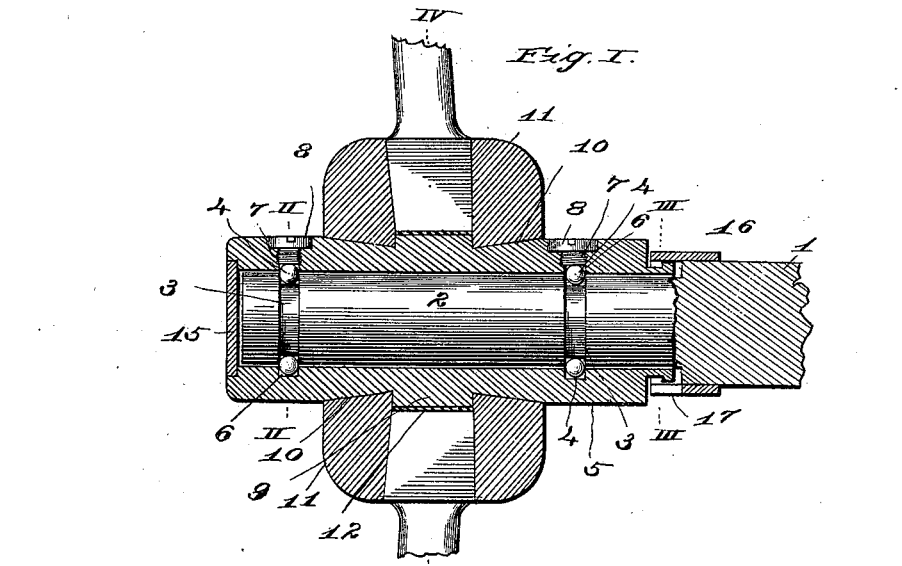
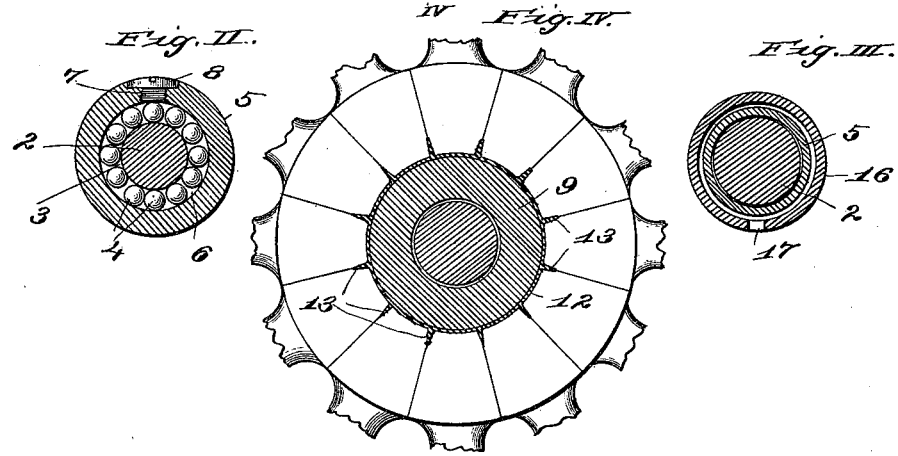
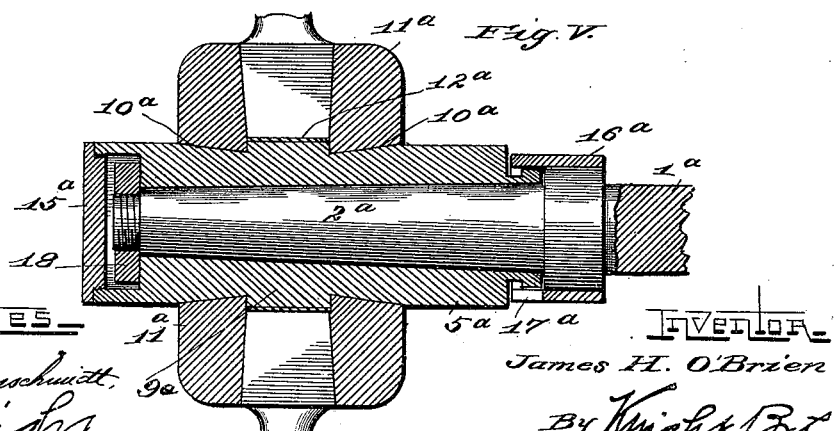
Witnesses
G. A. Vauberschmidt,
E. S. Knight
Inventor
James H. O'Brien
By Knight Bro'
Attorneys

UNITED STATES PATENT OFFICE.

JAMES H. O'BRIEN, OF ST. LOUIS, MISSOURI.

HUB FOR VEHICLE-WHEELS.

SPECIFICATION forming part of Letters Patent No. 641,881, dated January 23, 1900.

Application filed April 1, 1899. Serial No. 711,383. (No model.)

*To all whom it may concern:*

Be it known that I, JAMES H. O'BRIEN, a citizen of the United States, residing at the city of St. Louis, in the State of Missouri, have invented certain new and useful Improvements in Hubs for Vehicle-Wheels, of which the following is a full, clear, and exact description, reference being had to the accompanying drawings, forming part of this specification.

My invention relates to metallic hubs for vehicle-wheels so constructed as to afford a superior degree of durability, strength, and rigidity of the hub and the spokes assembled therein.

My invention consists in features of novelty hereinafter fully described, and pointed out in the claims.

Figure I is a longitudinal sectional view of a hub constructed in accordance with my invention and provided with ball-bearing connection to the spindle. Fig. II is a cross-sectional view taken on the line II II, Fig. I. Fig. III is a cross-sectional view taken on the line III III, Fig. I. Fig. IV is a cross-sectional view taken on the line IV IV, Fig. I, the inner ends of the wheel-spokes being shown in elevation. Fig. V is a similar view to Fig. I, but shows a form of hub and receiving-spindle from which the bearing-balls are omitted.

1 designates a vehicle-axle, and 2 a spindle thereof. The spindle illustrated in Fig. I is provided with circumferential grooves 3, adapted to receive bearing-balls 4, while in the construction shown in Fig. V the grooves and bearing-balls are dispensed with.

Referring first particularly to Figs. I and IV, inclusive, 5 designates the hub-sleeve, adapted to operate on the spindle 2. This sleeve is made of wrought-steel and is provided interiorly with grooves 6 of dimensions corresponding to dimensions of the grooves 3 in the axle-spindle, and the grooves 3 and 6 are arranged to coincide with each other to form a raceway for the bearing-balls 4. The balls 4, fitting and working, as they do, in the coinciding grooves contained by the spindle and hub-sleeve, serve as retainers to hold the said sleeve to the spindle. In securing the sleeve by said balls the sleeve is first placed on the spindle and the balls are inserted through an aperture 7 in the sleeve, and the aperture is closed by a screw 8, that prevents the exit of the balls.

The hub-sleeve is constructed with a central annular enlargement 9, (see Fig. I,) and at each side of said enlargement the sleeve is formed with inwardly-extending tapers 10.

11 are rings located at each side of the enlargement 9. These rings have central tapering apertures that correspond to the tapers 10 of the sleeve 5, whereby when the rings are placed upon and secured to the sleeve interlocking joints are produced that prevent any displacement of said rings. The rings are designed to be shrunk onto the sleeves while hot, and in such condition they may be readily fitted to the wrought-steel sleeve.

12 designates a collar fitted to the circumferential face of the sleeve enlargement and provided with radial ribs 13. This collar is intended to be shrunk onto the enlargement before the rings 11 are both secured to the sleeve.

14 designates the inner ends of the wheel-spokes, which are tapered on their abutting sides, so as to abut each other compactly. The edges of the spokes are tapered to correspond to the tapering inner opposing faces of the rings 11, so that the spokes are made to seat snugly and firmly in place between the rings, and their extremes are seated in the sockets formed between the ribs 13 on the collar 12.

The sleeve 5 is of wrought-steel, as stated, and its inner surface is case-hardened to present a durable and efficacious wearing-surface.

15 designates a dust-cap pressed into a seat in the outer end of the hub-sleeve.

16 designates a dust-excluding collar shrunk onto the axle or its spindle. This collar is arranged to extend over the reduced and grooved inner end of the hub-sleeve and is provided with an opening 17, through which any dirt that finds access into the groove in the reduced inner end of the hub-sleeve may escape instead of entering the interior of the sleeve to the bearing-surfaces.

In Fig. V, I have shown a hub in which the bearing-balls shown in Fig. I are dispensed with. This hub is otherwise of similar construction to that illustrated by Fig. I, except that the hub-sleeve is held to the spindle by a retaining-nut 18, that is inclosed by a dust-cap 15ª, screwed into the end of the sleeve.

I claim as my invention—

1. In a vehicle-wheel hub, the combination of a sleeve formed with a central enlargement and with circumferential seats tapering toward said enlargement, and rings formed with faces conforming to the enlargement and seats, shrunk in position between the lateral faces of the enlargement and the tapering seats, and spaced apart by the enlargement to provide a space to receive the inner ends of the wheel-spokes; substantially as described.

2. In a vehicle-wheel hub, the combination of a sleeve provided with an annular enlargement and inwardly-tapering seats adjacent thereto, and rings shrunk onto said tapering seats and by them held against said enlargement and having their opposed free faces formed to provide a tapering seat between them for the inner ends of the wheel-spokes; substantially as described.

3. In a vehicle-wheel hub, the combination of a sleeve provided with an annular enlargement, rings shrunk thereon, a collar surrounding said enlargement between said rings provided with ribs adapted to form sockets for the inner extremities of the wheel-spokes, said rings being adapted to receive the inner ends of the wheel-spokes and confine them in position with their inner extremities resting between the ribs on said collar, substantially as described.

JAS. H. O'BRIEN.

In presence of—
E. S. KNIGHT,
G. A. TAUBERSCHMIDT.